(12) United States Patent
Ruehle et al.

(10) Patent No.: US 7,285,070 B2
(45) Date of Patent: Oct. 23, 2007

(54) VARIATOR DISK AND VARIATOR FOR A TOROIDAL TRANSMISSION

(75) Inventors: Guenter Ruehle, Loechgau (DE); Markus Kirchner, Ludwigsburg (DE); Markus Trefz, Loewenstein (DE); Dirk Lautenschlager, Ostfildern (DE); Lothar Wolf, Holzkirchen (DE); Ulrich Ohnemus, Hattenhofen (DE); Ekkehard Rieder, Munich (DE)

(73) Assignees: GETRAG Getriebe- und Zahnradfabrik Hermann Hagenmeyer GmbH & Cie KG (DE); Bayerische Motoren Werke Aktiengeselllschaft (DE)

( * ) Notice: Subject to any disclaimer, the term of this patent is extended or adjusted under 35 U.S.C. 154(b) by 0 days.

(21) Appl. No.: 11/329,387

(22) Filed: Jan. 10, 2006

(65) Prior Publication Data

US 2006/0194669 A1 Aug. 31, 2006

Related U.S. Application Data

(63) Continuation of application No. PCT/EP2004/007417, filed on Jul. 7, 2004.

(30) Foreign Application Priority Data

Jul. 11, 2003 (DE) ............................ 203 18 897 U
Dec. 18, 2003 (DE) ............................... 103 61 332

(51) Int. Cl.
*F16H 55/32* (2006.01)
(52) U.S. Cl. ............................. 476/73; 476/42; 476/47
(58) Field of Classification Search ................... 74/40, 74/41, 42, 47, 72, 73
See application file for complete search history.

(56) References Cited

U.S. PATENT DOCUMENTS

| | | | |
|---|---|---|---|
| 2,100,632 A | 11/1937 | Chilton | |
| 3,184,983 A | 5/1965 | Kraus | |
| 3,394,617 A | 7/1968 | Dickenbrock | |
| 3,727,474 A | 4/1973 | Fullerton | |
| 3,820,416 A | 6/1974 | Kraus | |
| 4,428,246 A * | 1/1984 | Horton et al. | 476/41 |
| 5,138,894 A | 8/1992 | Kraus | |

FOREIGN PATENT DOCUMENTS

| | | | |
|---|---|---|---|
| DE | 171098 | | 2/1882 |
| DE | 840339 | | 6/1952 |
| DE | 873 782 | C | 4/1953 |
| DE | 873782 | * | 4/1953 |
| DE | 12 17 165 | B | 5/1966 |
| DE | 199 29 207 | A1 | 1/2001 |
| DE | 100 50 340 | A1 | 6/2001 |
| DE | 100 59 781 | A | 11/2001 |
| DE | 102 24 875 | A1 | 1/2003 |
| DE | 203 18 897 | U | 3/2003 |
| DE | 102 29 579 | A1 | 1/2004 |
| EP | 0 771 970 | A | 5/1997 |
| EP | 20011295904 | * | 4/2000 |
| WO | WO 2004/005767 | A | 1/2004 |

* cited by examiner

*Primary Examiner*—David M. Fenstermacher
(74) *Attorney, Agent, or Firm*—Knobbe, Martens, Olson & Bear, LLP

(57) ABSTRACT

What is proposed is a variator disk for a toroidal variator, in particular for a motor vehicle toroidal transmission. The variator disk has a curved running surface which is oriented coaxially with respect to a variator axis and on which rollers of the toroidal variator can roll. The variator disk having furthermore at least two partial disks which are designed as a traction disk, on which the running surface is formed, and as a supporting disk, respectively. The supporting disk is designed for supporting axial forces applied to the running surface. The traction disk is supported on the supporting disk in the radial direction to the variator axis.

17 Claims, 3 Drawing Sheets

VARIATOR DISK AND VARIATOR FOR A TOROIDAL TRANSMISSION

CROSS-REFERENCE TO RELATED APPLICATIONS

This application is a continuation of PCT/EP2004/007417, filed on Jul. 7, 2004.

BACKGROUND OF THE INVENTION

1. Field of the Invention

The present invention relates to a variator disk for a toroidal variator and to a variator of this type which is suitable for a motor vehicle toroidal transmission.

2. Description of the Related Art

In the field of transmissions for motor vehicles, there is a trend toward continuously variable transmissions. Continuously variable transmissions make it possible, in general, to operate the series connected internal combustion engine in motor vehicles within a favorable rotational speed range independently of the respective motor vehicle speed. This improves the efficiency of the drive train formed by the internal combustion engine and by the continuously variable transmission. Furthermore, continuously variable transmissions afford a particularly high degree of driving comfort.

Among continuously variable transmissions, toroidal transmissions, as they are known, are especially important, specifically, in particular, owing to their higher torque capacity, as compared with belt type continuously variable transmissions (CVTs).

Among toroidal transmissions, the Torotrak™ system has particular significance (cf. www.torotrak.com).

A typical toroidal transmission of this type has a variator arrangement with two variators. Each variator has two variator disks. The disks have annular traction or running surfaces facing one another which in each case define a toroidal space. The toroidal spaces are arranged coaxially with respect to a variator axis. Within the toroidal spaces, rollers are in each case arranged, which come into engagement with the variator disks in order to transfer a torque from one variator disk to the other variator disk. The rollers are arranged so as to be distributed over the circumference of the toroidal space and can be adjusted spatially within the toroidal space, in order to adjust the transmission ratio of the variator continuously.

In the prior art, the variator disks are connected to an assigned variator shaft, as a rule via toothings in the hub region.

Furthermore the variator disks known hitherto are supported axially on the variator shaft via a collar. This collar is small in comparison with the diameter of the variator disks. This gives rise to a high bending moment. High stresses are generated within the component as a result of the bending moment. These can be absorbed only by means of a high-mass type of construction.

The high-mass type of construction of the variator disks leads to a high weight, to a high mass moment of inertia and to an enlargement of the overall construction length of the transmission. The high mass moment of inertia reduces the dynamics of the vehicle. Due to the high weight, high material costs are incurred, since the disks are produced as a rule, from high-quality material.

The high axial pressure forces, particularly also during an adjustment of the rollers, result in a high load on the variator disks in the vicinity of the toothing. This may lead to excessive stresses and consequently cause failure.

The manufacture of the toothings is cost-intensive, particularly since the material of the known variator disks is, as a rule, a high-strength rolling bearing steel.

So that the high axial forces can be absorbed more effectively, one variator disk may be assigned a supporting disk which is arranged on that side of the variator disk which lies opposite the running surface. By virtue of the supporting disk, it is possible to produce the variator disk with a lower mass and lower weight. Costs are thereby saved. In other words, in this embodiment, the variator disk is formed by at least two partial disks which are designed as a traction disk, on which the running surface is formed, and as a supporting disk, respectively. The supporting disk is designed for supporting axial forces applied to the running surface.

Furthermore, as a rule, the supporting disk is connected to the shaft positively in the circumferential direction. This may take place via a toothing. However, the supporting disk may also be produced in one piece with the shaft.

Although it is conceivable, even when a supporting disk is used, to connect the traction disk to the shaft via a toothing in the hub region, it is nevertheless preferable to cause the transfer of torque from the traction disk to the shaft to take place via the supporting disk.

This may take place in general by means of nonpositive or frictional connection. This is because the high axial pressure forces can be utilized for torque transfer if the axial bearing surfaces on the supporting disk, on the one hand, and on the traction disk, on the other hand, are suitably designed. In this case, the coefficient of friction of steel/steel is utilized in the bearing region.

However, the transfer of the torque from the traction disk to the supporting disk may also take place positively. In this case, it is conceivable, in general, to connect the traction disk positively in the hub region of the supporting disk. In order to reduce the circumferential forces, however, it is more beneficial to implement the torque transfer in the region of the outer circumference of the supporting disk or of the traction disk.

In this case, it is likewise conceivable, in general, to provide a toothing in the circumferential region. It is considered more favorable, however, to insert positive elements, such as, for example, balls, into corresponding radial recesses of the supporting disk, on the one hand, and of the traction disk, on the other hand.

These approaches have in common the fact that excessive stresses due to the notch effect may occur in the region of positive connection of the traction disk and supporting disk.

The object of the present invention is to specify an improved variator disk, in particular a variator disk which possesses a low weight and requires a small construction space.

SUMMARY OF THE INVENTION

This object is achieved with a variator disk for a toroidal variator, in particular for a motor vehicle toroidal transmission, the variator disk having a curved running or traction surface which is oriented coaxially with respect to a variator axis and on which rollers of the toroidal variator can roll, the variator disk having furthermore at least two partial disks which are designed as a traction disk, on which the running surface is formed, and as a supporting disk, respectively, the supporting disk being designed for supporting axial forces applied to the running surface, and, furthermore, the traction disk being supported on the supporting disk in the radial direction to the variator axis.

The above object is achieved furthermore by a variator for a toroidal transmission, having two variator disks, between which is arranged a toroidal space in which at least one roller is mounted rotatably, in order to transfer torque from one variator disk to the other with a variable transmission ratio, at least one variator disk being designed in the same way as the above-defined variator disk according to the invention.

As a result of the radial support, the variator disk can, overall, be stabilized significantly. A reduction in the variator mass, in the mass moments of inertia and in deformation can be achieved. Furthermore it is possible to reduce the necessary variator disk thickness. This leads to a reduction in the overall length of the variator.

It is of particular advantage if the traction disk is supported on a circumferential portion of the supporting disk.

It is of particular advantage, in this case, if the running surface defines one side of a toroidal space, the center circle of which possesses a toroidal center radius, and the radius of the circumferential portion of the supporting disk being larger than or equal to the toroidal center radius.

As a result of this comparatively large radial bearing diameter, an enlargement of the supporting base is obtained. Furthermore, a reduction in the disk thickness, in the mass moment of inertia and in the weight is achieved.

It is of particular advantage if the radius of the circumferential portion of the supporting disk is equal to the toroidal center radius.

It was shown that precisely this dimensioning puts the advantages according to the invention to particularly good effect.

According to a further preferred embodiment, an axial bearing portion of the supporting disk, said axial bearing portion serving at least for supporting the axial forces introduced into the traction disk, adjoins the circumferential portion via a flattened or rounded annular edge, the annular edge of the supporting disk not touching a corresponding annular edge of the variator disk.

Notch stresses in the transitional region of the axial bearing portion and circumferential portion are thereby avoided.

According to a further preferred embodiment, the traction disk is centered on the supporting disk. In this embodiment, the traction disk is not centered on the shaft and, as a rule, does not touch the latter. Static overdetermination is thus avoided.

In this case, it is of particular advantage if the traction disk is centered on the circumferential portion of the supporting disk.

This makes it possible to utilize the circumferential portion twofold, on the one hand, for centering and on the other hand, for the radial support of the bending moment introduced into the outer region of the traction disk.

Furthermore, according to a further embodiment, it is advantageous if the traction disk has a central bore for leading through a shaft to which the supporting disk is secured, and if the inner circumference of the central bore is spaced apart, free of touching, from the outer circumference of the shaft.

This avoids the situation where static overdetermination occurs particularly when the traction disk is centered on the supporting disk and has radial deformations when the roller runs on the inside diameter.

It goes without saying that the shaft is preferably the variator shaft.

According to a further embodiment which is preferred overall, an axial bearing portion of the supporting disk and an axial force transfer portion of the traction disk are coordinated with one another in terms of form, material and surface quality, in such a way that a torque transfer by means of these portions can take place by nonpositive or frictional connection. The coefficient of friction of roller with respect to toroidal disk is in this case as a rule, very much lower than the coefficient of friction of toroidal disk with respect to supporting disk.

It is thereby possible to carry out the torque transfer solely on the basis of a nonpositive or frictional connection.

In this embodiment, therefore, it is preferable if the traction disk and the supporting disk are not connected positively to one another in the circumferential direction.

Since a positive connection, in particular a toothing or a connection by means of balls and recesses, is dispensed with, on the one hand, a cost saving is obtained. However, an improvement in terms of load-bearing capacity is also achieved since there are no notching points in the region of the positive connection. The variator disk may in this case be designed overall, to be narrower or thinner in the axial direction.

It is of particular advantage, furthermore, if the traction disk and the supporting disk are produced from the same basic material.

This makes it possible, overall, to have a more cost-effective manufacture. The different intended uses can be taken into account in that, for example, the case-hardness depths are defined according to the different loads (rolling load, bending load, etc.).

It is, of course, also possible, alternatively, to produce the two partial disks from different materials.

However, insofar as the two partial disks are produced from the same basic material, it is advantageous if the traction disk and the supporting disk are produced from steel.

It is thereby possible, overall, for a cost-effective variator disk to be produced. Steel can be optimized sufficiently well for various intended uses.

It is of particular advantage overall if at least the supporting disk is produced from case-hardened steel.

This leads to a cost-effective type of construction of the variator disk, since case-hardened steel, as a rule, is more cost-effective than ceramic materials or metal matrix composite materials.

According to a further embodiment which is preferred overall, a back surface of the traction disk, said back surface lying axially opposite the running surface, is oriented essentially flush with a back surface of the supporting disk.

This ensures that the bending moments introduced into the traction disk can be supported essentially completely on the circumferential portion inwardly in the radial direction.

According to a further preferred embodiment, the traction disk is supported on a circumferential portion of the supporting disk, wherein, furthermore, a back surface of the traction disk follows, essentially free of steps, the contour of the opposite running surface radially outwardly, starting from the circumferential portion of the supporting disk.

This avoids the situation where notching points occur at such steps in the traction disk. It can also be ensured that the bending moments can be introduced optimally into the supporting disk. Stated in simplified form, the bending moments lead to stresses inside the traction disk which, directed approximately parallel to the running surface, are capable of being supported on the circumferential portion of the supporting disk.

According to a further preferred embodiment, the back surface of the variator disk has no horizontal portion.

This likewise leads to an optimization of the introduction of the forces arising from bending moments into the supporting disk.

It is advantageous, overall, if the back surface of the variator disk is designed in the form of an annular cup.

This affords a structure by means of which the introduction of stresses into the supporting disk can be further optimized.

According to a further embodiment which is preferred overall, the supporting disk has an axial portion, the inner circumference of which is connected to a variator shaft positively in the direction of rotation, the axial portion extending through a central bore of the traction disk.

As a result, overall, an axially compact type of construction is achieved.

It goes without saying that the features mentioned above and those yet to be explained below, can be used not only in the combination specified in each case, but also in other combinations or alone, without departing from the scope of the present invention.

BRIEF DESCRIPTION OF THE DRAWINGS

Exemplary embodiments of the invention are illustrated in the drawing and are explained in more detail in the following description. In the drawing.

DETAILED DESCRIPTION OF THE INVENTION

Figure 1:
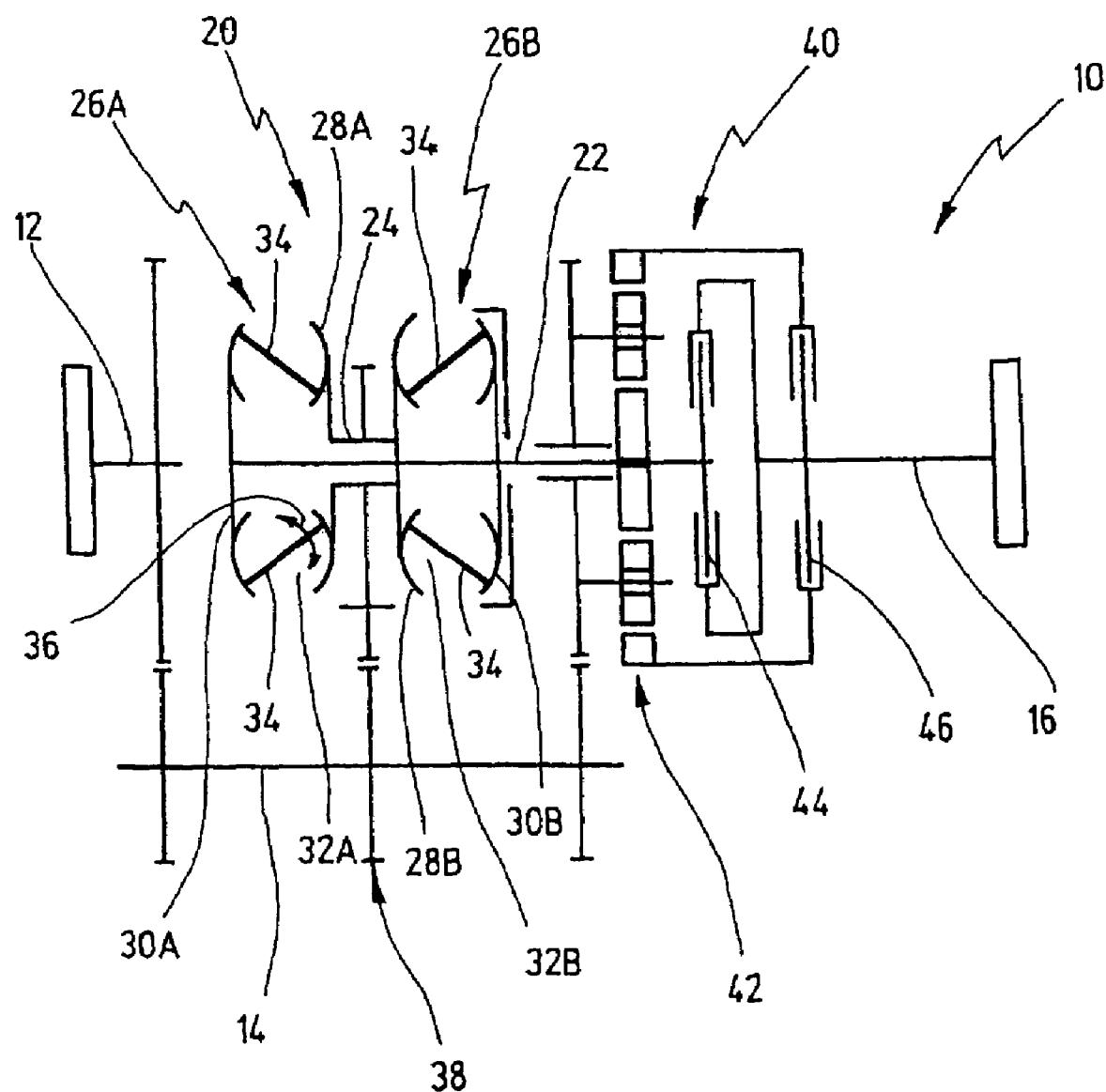
FIG. 1 shows a diagrammatic illustration of a toroidal transmission which has two variators according to the invention.

In FIG. 1, a diagrammatically illustrated toroidal transmission is generally designated by 10.

The toroidal transmission 10 has a transmission input shaft 12, a countershaft 14 and a transmission output shaft 16.

A variator arrangement in the toroidal transmission 10 is shown at 20. The variator arrangement 20 has a variator main shaft 22 and a variator secondary shaft 24. Furthermore the variator arrangement 20 contains two variators 26A, 26B.

Each variator has a driving disk 28A, 28B and a driven disk 30A, 30B.

The driving disks 28A, 28B enclose, together with the respective driven disks 30A, 30B, in each case a toroidal space 32A, 32B.

A plurality of rollers 34, as a rule in each case three rollers 34, are arranged in the toroidal spaces 32A, 32B in each case so as to be distributed circumferentially over the toroidal space.

The rollers 34 can be adjusted spatially within the toroidal space 32 by means of an actuator mechanism, not illustrated in any more detail, as shown diagrammatically at 36, in order to vary the transmission ratio of the variator arrangement 20. In this case, it goes without saying that all the rollers 34 of the variators 26A, 26B are adjusted codirectionally so that the reaction forces occurring can be absorbed uniformly over the circumference of the variator arrangement 20.

At 38, a wheel set is shown, which connects the countershaft 14 in the manner of a constant to the variator secondary shaft 24 to which the driving disks 28A, 28B are secured. The driven disks 30A, 30B are secured to the variator main shaft 22 which is connected to a summing transmission 40.

The summing transmission 40 has a planetary wheel set 42. The variator main shaft 22 is connected to the sun wheel of the planetary wheel set 42. The countershaft 14 is connected to the planet carriers of the planetary wheel set 42 via a further wheel set (not designated).

The sun wheel can be connected to the transmission output shaft 16 via a high-regime clutch 44. The ring wheel of the planet wheel set 42 can be connected to the transmission output shaft 16 via a low-regime clutch 46.

The functioning of the toroidal transmission 10 is generally known and is not described here in detail for the sake of concise illustration.

Figure 2:
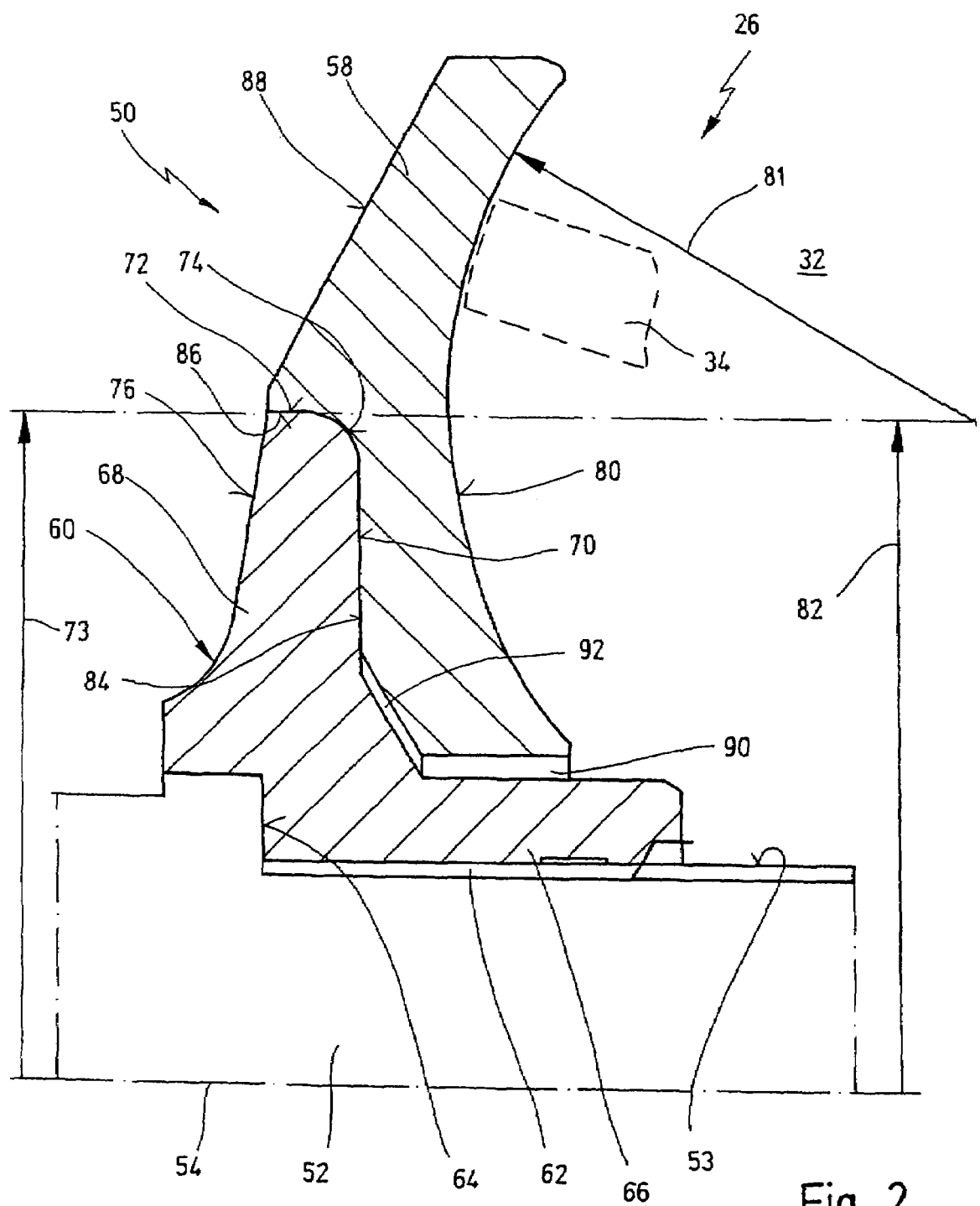
FIG. 2 shows the upper part of a longitudinal section through a first embodiment of a variator disk according to the invention.

FIG. 2 shows a detail of a variator 26 of the toroidal transmission 10 and, in particular, shows an upper half of a longitudinal section of a variator disk 50.

The variator disk 50 may form any one of the variator disks 28, 30 in the toroidal transmission 10.

The variator disk 50 is mounted on a variator shaft 52. The variator shaft 52 may be the variator main shaft 22 or the variator secondary shaft 24.

The variator shaft 52 has an outer circumference, shown at 53, and defines a variator axis 54.

The variator disk 50 has a traction disk 58 and a supporting disk 60.

The supporting disk 60 is mounted on the outer circumference 53 of the variator shaft 52 via a toothing 62. The supporting disk 60 is thus connected fixedly in terms of rotation to the variator shaft 52 positively in the circumferential direction.

The variator shaft 52 has a stop 64, on which the supporting disk 60 is supported in the axial direction.

The supporting disk 60 is approximately L-shaped in the longitudinal section, with an axial portion 66 extending axially and with a radial portion 68 extending radially from the latter.

The toothing 62 is formed on the inner circumference of the axial portion 66.

Formed on the radial portion 68, on the side pointing toward the traction disk 58, is an axial bearing portion 70. The latter extends essentially perpendicularly with respect to the variator axis 54.

On the outer circumference of the radial portion 68, a circumferential portion 72 is provided, which extends approximately parallel with respect to the variator axis 54. The circumferential portion 72 has a radius 73.

The axial bearing portion 70 and the circumferential portion 72 are connected by means of an annular edge 74 which in the present case has a rounded design.

At 76, a back surface is shown, which is formed on the radial portion 68 and which lies opposite the axial bearing portion 70. The back surface 76 generally points away from the traction disk 58.

The traction disk 58 has a curved annularly peripheral running surface 80. The running surface 80 defines, with a corresponding running surface of a counterdisk (not illustrated), a toroidal space 32.

The toroidal space 32 defines a toroidal center circle. The distance from the toroidal center circle to the opposite running surfaces of the variator disks is essentially constant. This distance is illustrated in FIG. 2 by a roller radius 81. This distance corresponds to the radius of a roller 34 which is arranged in the toroidal space 32 and is indicated only partially in FIG. 2 (for the sake of clear illustration).

The toroidal center circle has a toroidal center radius which is shown at 82 in FIG. 2.

The running surface 80 is provided on the traction disk 58 on the side which faces away from the supporting disk 60. On the side facing the supporting disk 60, an axial force transfer portion 84 is formed on the traction disk 58. The axial force transfer portion 84 corresponds in form and orientation to the axial bearing portion 70 of the supporting disk 60 and bears against said axial bearing portion during operation.

Furthermore, the traction disk 58 has a circumferential portion 86 which engages over the supporting disk 60 and which is assigned to the circumferential portion 72 of the supporting disk 60. Furthermore, the traction disk 58 has a back surface 88 on its side lying opposite the running surface 80. The back surface 88, where it runs further on, is oriented flush with the back surface 76 of the supporting disk 60.

The traction disk 58 has, furthermore, a central bore 90. The central bore 90 is dimensioned such that the axial portion 66 of the supporting disk 60 can extend through here. A clearance is arranged between the outer circumference of the axial portion 66 and the inner circumference of the central bore 90 so that the traction disk 58 and the supporting disk 60 do not touch one another in this region.

Furthermore, between the axial force transfer portion 84 and the central bore 90, there is a beveled portion which is spaced apart by a gap 92 from a correspondingly beveled portion of the supporting disk 60.

The relative dimensions of the traction disk 58 and supporting disk 60 are, overall, such that these do not touch one another in a region radially within the axial bearing portion 70.

In the longitudinal sectional view of FIG. 2, it can be seen that the traction disk 58 and supporting disk 60 fit one into the other in such a way that their form corresponds essentially to the form of a one-part variator disk. In other words, the radial portion 68 of the supporting disk 60 is received into an axial recess on the rear side 88 of the traction disk 58 in such a way that the back surfaces 76, 88 merge flush one into the other.

The traction disk 58 is in this case supported in the axial direction with its axial force transfer portion 84 on the axial bearing portion 70 of the supporting disk 60. When a roller 34 is in the position illustrated in FIG. 2, a force which is not only axial, but generates a bending moment, is exerted on the traction disk 58. The radial forces which occur as a result of the bending moment and are thus introduced into the traction disk 58 can be supported on the supporting disk 60 via the circumferential portions 86, 72.

The traction disk 58 in this case has a high-mass design above the circumferential portion 86, so that the radial forces can be introduced reliably into the supporting disk 60. The traction disk 58 is centered via its circumferential portion 86 on the supporting disk 60 (and consequently also with respect to the variator shaft 52). However, on account of the high-mass type of construction, the design of the traction disk 58 above the circumferential portion 86 is suitable for introducing radial forces into the supporting disk 60, specifically via its circumferential portion 72. In other words, that part of the traction disk 58 which engages over the circumferential portion 72 is not designed merely as a centering collar. On the contrary, this portion is an integral component of the traction disk 58 absorbing the variator forces.

The back surface 76, 88 of the variator disk 50 is designed in the manner of an annular cup. Below the toroidal center radius 82, the thickness of the variator disk 50 becomes, overall, thicker radially inwardly toward the variator axis 54. Above the toroidal center ranges 82, the thickness of the variator disk 50 (or of the traction disk 58) decreases radially outwardly to an increasing extent. In this case, because of the cup form, the back surface 88 of the traction disk 58 follows approximately the profile of the running surface 80 above the toroidal center radius 82.

The radius 73 of the circumferential portion 72 is approximately equal to the toroidal center radius 82.

The impression of an annular cup is obtained, that is to say a form as though the two-part variator disk 50 surrounds the toroidal space 32 in the manner of an annular cup.

Owing to the gradual increase in thickness of the two-part variator disk 50 from the radially outermost portion towards the axial bearing portion 70, an approximately frustoconical form is obtained in the longitudinal section.

The back surface 76, 88 of the variator disk 50 has essentially no horizontal portion. Instead, the profile of the back surface 76, 88 is approximately arcuate, with a markedly larger radius than the roller radius 81.

Furthermore, the back surface 76, 88 of the variator disk 50 is designed to be essentially free of steps.

The measure whereby the axial portion 66 passes through the central bore 90 results, overall, in a compact construction in the axial direction.

The traction disk 58 and the supporting disk 60 are not connected positively to one another in the circumferential direction. Torque transfer takes place solely by virtue of a nonpositive or frictional connection at those surfaces of the axial bearing portion 70 and axial force transfer portion 84 which lie opposite one another. This is because the high axial impingement forces occurring in the case of a variator 26 of this type can thereby be utilized for the transfer of torque.

The traction disk 58 and the supporting disk 60 are preferably both produced from steel. The traction disk 58 may be produced, for example, from rolling bearing steel. By contrast the supporting disk 60 may be produced from normal case-hardened steel.

Alternatively, it is also possible to produce both disks from case-hardened steel, the case-hardness depths being defined according to the different loads (rolling load, in the case of the traction disk 58 and bending load, in the case of the supporting disk 60).

Since a positive connection is dispensed with, on the one hand, cost savings are obtained. On the other hand, points at which excessive notch stresses may occur are avoided. The variator disk can consequently be designed, overall, to be narrower or thinner in the axial direction.

The circumferential portions 72, 86 consequently serve for centering and for the support of bending moments. The surfaces of the axial bearing portion 70 and axial force transfer portion 84 serve for axial support and for torque transfer.

The functioning of the variator disk 50 is as follows:

During operation, a high pressure force is exerted on the running surface 80 of the traction disk 58 by the roller 34. The axial forces occurring in this case are absorbed via the axial bearing portion 70 of the supporting disk 60. The bending moments occurring and the radial forces directed inwardly toward the variator axis 54, which are induced as a result, are absorbed via the circumferential portion 72 of the supporting disk. As a result of the rotation of the roller 34, a torque about the variator axis 54 is exerted on the traction disk 58. Owing to the high axial pressure forces in the surfaces of the axial bearing portion 70 and axial force transfer portion 84, the supporting disk 60 is in this case made following in the circumferential direction. Due to the positive connection between the supporting disk 60 and the variator shaft 52 in the circumferential direction, the variator shaft 52 is consequently likewise made following in the circumferential direction.

The variator disk 50 may be a driving disk 28 or a driven disk 30.

Figure 3:
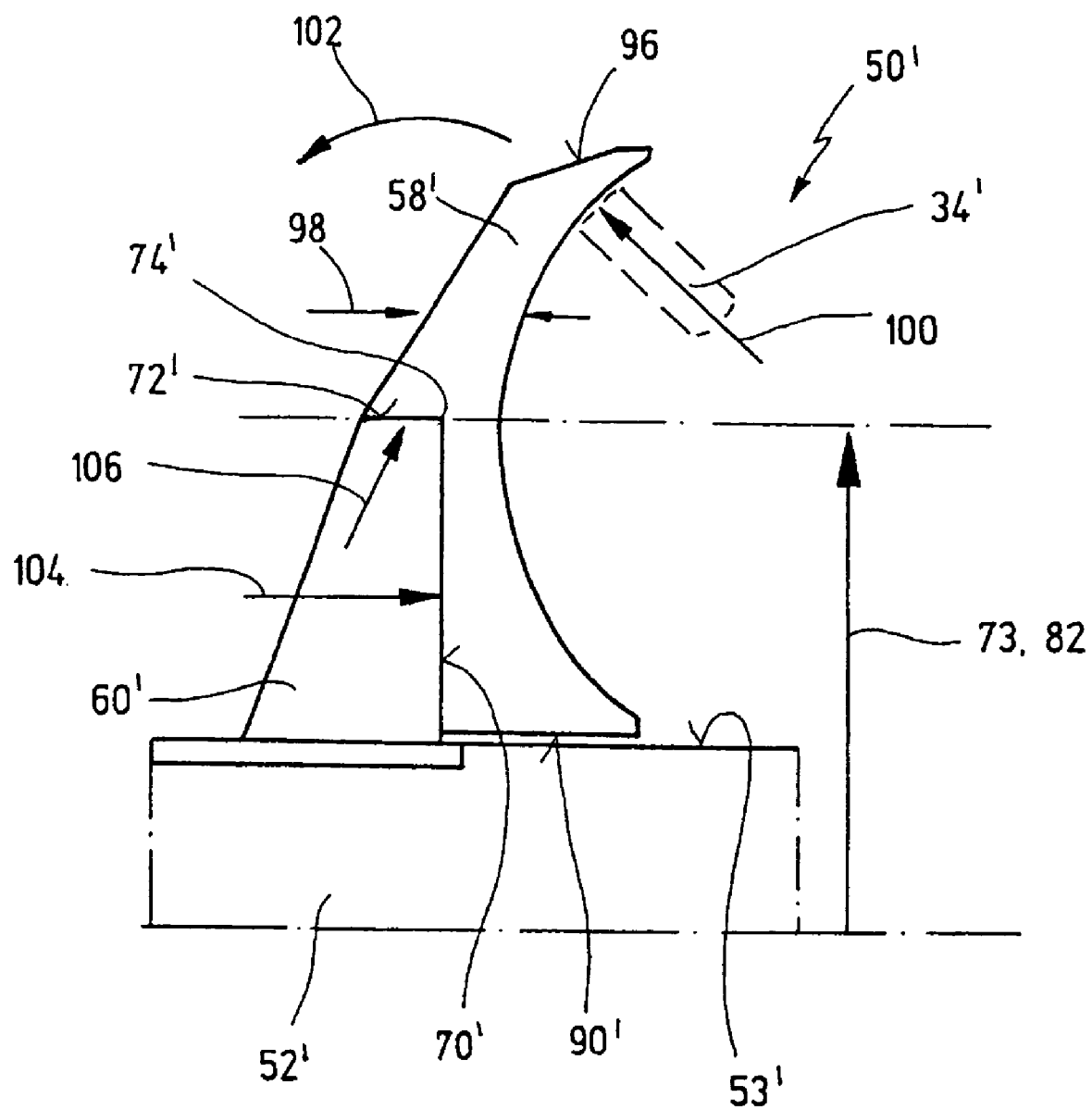
FIG. 3 shows a view, similar to FIG. 2, of an alternative embodiment to the variator disk according to the invention.

In FIG. 3, an alternative embodiment to a variator disk according to the invention is designated in general by 50'.

The variator disk 50' corresponds in form and functioning, in general, to the variator disk 50 of FIG. 2. Only the differences are therefore dealt with below.

On the one hand, it can be seen that the traction disk 58' has a flattening 96 in its radially outer portion. The traction disk 58 thereby tapers to a sharper point in its radially outer portion.

The thickness of the variator disk 50' is shown diagrammatically at 98. This continuously increases radially inwardly from a radially outer portion of the variator disk 50'.

The supporting disk 60' has only one radial portion which is fitted into a rear-side recess of the traction disk 58'. The toothing between the supporting disk 60' and variator shaft 52' consequently lies behind the traction disk 58'.

A peripheral annular gap is arranged between the inner circumference of the central bore 90' of the traction disk 58' and the outer circumference of the variator shaft 52.

In this embodiment, the annular edge 74' is not rounded. It may, however, be rounded, in order to avoid notch stresses in this region.

FIG. 3 contains, furthermore, the illustration of forces which occur. This illustration can apply in the same way to the variator disk 50 of FIG. 2.

A roller force 100 is thus exerted on the traction disk 58' by a roller 34'. Since these forces can also act above the toroidal center circle 73, a bending moment 102 may arise in this situation. The stresses occurring in this case are absorbed radially by the circumferential portion 72', as shown at 106.

The axial forces occurring are absorbed via the axial bearing portion 70' as shown diagrammatically at 104.

What is claim is:

1. A variator disk for a toroidal variator for a motor vehicle toroidal transmission, the variator disk having a curved running surface which is oriented coaxially with respect to a variator axis and on which rollers of the toroidal variator can roll, the variator disk having furthermore at least two partial disks which are a traction disk, on which the running surface is formed, and a supporting disk, respectively, the supporting disk supporting axial forces applied to the running surface, and, furthermore, the traction disk being supported in the radial direction with respect to the variator axis on a circumferential portion of the supporting disk, the supporting disk further comprising an axial bearing portion, said axial bearing portion serving at least for supporting the axial forces introduced into the traction disk, adjoining the circumferential portion via a rounded annular edge.

2. The device as claimed in claim 1, with the running surface defining one side of a toroidal space, the center circle of which possesses a toroidal center radius, and the radius of the circumferential portion of the supporting disk being larger than or equal to the toroidal center radius.

3. The device as claimed in claim 2, the radius of the circumferential portion of the supporting disk being equal to the toroidal center radius.

4. The device as claimed in claim 1, the traction disk being centered on the supporting disk.

5. The device as claimed in claim 4, the traction disk being centered on the circumferential portion of the supporting disk.

6. The device as claimed in claim 1, the traction disk having a central bore for leading through a shaft to which the supporting disk is secured, and the inner circumference of the central bore being spaced apart, free of touching, from the outer circumference of the shaft.

7. The device as claimed in claim 1, wherein an axial bearing portion of the supporting disk and an axial force transfer portion of the traction disk being configured such that a torque transfer by means of these portions can take place by nonpositive or frictional connection.

8. The device as claimed in claim 1, the traction disk and the supporting disk not being connected positively to one another in the circumferential direction.

9. The device as claimed in claim 1, the traction disk and the supporting disk being produced from the same material.

10. The device as claimed in claim 9, the traction disk and the supporting disk being produced from steel.

11. The device as claimed in claim 1, at least the supporting disk being produced from case-hardened steel.

12. The device as claimed in claim 1, a back surface of the traction disk, said back surface lying axially opposite the running surface, being oriented essentially flush with a back surface of the supporting disk.

13. The device as claimed in claim 1, the traction disk being supported on a circumferential portion of the supporting disk, and, furthermore, a back surface of the traction disk following, free of steps, the contour of the opposite running surface radially outwardly, starting from the circumferential portion of the supporting disk.

14. The device as claimed in claim 1, the back surface of the variator disk has the form of an annular cup.

15. The device as claimed in claim 1, the supporting disk having an axial portion, the inner circumference of which is connected to a variator shaft positively in the direction of rotation, and the axial portion extending through a central bore of the traction disk.

16. A variator disk for a toroidal variator for a motor vehicle toroidal transmission, the variator disk having a curved running surface which is oriented coaxially with respect to a variator axis and on which rollers of the toroidal variator can roll, the variator disk having furthermore at least two partial disks which are a traction disk, on which the running surface is formed, and a supporting disk, respectively, the supporting disk supporting axial forces applied to the running surface, and, furthermore, the traction disk being supported on the supporting disk in the radial direction with respect to the variator axis, wherein the traction disk and the supporting disk are connected to one another in the circumferential direction via a frictional connection only.

17. The device as claimed in claim 16, wherein an axial bearing portion of the supporting disk and an axial force transfer portion of the traction disk being configured such that a torque transfer by these portions is by frictional connection only.

* * * * *